United States Patent
Mikami et al.

(10) Patent No.: US 9,662,612 B2
(45) Date of Patent: May 30, 2017

(54) EXHAUST GAS PURIFICATION APPARATUS FOR INTERNAL COMBUSTION ENGINE

(71) Applicants: Akira Mikami, Susono (JP); Shigeki Nakayama, Gotenba (JP); Nobumoto Ohashi, Shizuoka-ken (JP); Keishi Takada, Kanagawa-ken (JP); Kenji Sakurai, Uji (JP); Yoshihisa Tsukamoto, Susono (JP); Hiroshi Otsuki, Gotenba (JP); Junichi Matsuo, Susono (JP); Ichiro Yamamoto, Kariya (JP)

(72) Inventors: Akira Mikami, Susono (JP); Shigeki Nakayama, Gotenba (JP); Nobumoto Ohashi, Shizuoka-ken (JP); Keishi Takada, Kanagawa-ken (JP); Kenji Sakurai, Uji (JP); Yoshihisa Tsukamoto, Susono (JP); Hiroshi Otsuki, Gotenba (JP); Junichi Matsuo, Susono (JP); Ichiro Yamamoto, Kariya (JP)

(73) Assignee: Toyota Jidosha Kabushiki Kaisha, Toyota-shi, Aichi (JP)

(*) Notice: Subject to any disclaimer, the term of this patent is extended or adjusted under 35 U.S.C. 154(b) by 0 days.

(21) Appl. No.: 14/443,179

(22) PCT Filed: Nov. 16, 2012

(86) PCT No.: PCT/JP2012/079794
§ 371 (c)(1),
(2) Date: May 15, 2015

(87) PCT Pub. No.: WO2014/076816
PCT Pub. Date: May 22, 2014

(65) Prior Publication Data
US 2015/0290587 A1 Oct. 15, 2015

(51) Int. Cl.
*B01D 53/94* (2006.01)
*F01N 3/08* (2006.01)
(Continued)

(52) U.S. Cl.
CPC ..... *B01D 53/9477* (2013.01); *B01D 53/0415* (2013.01); *B01D 53/9463* (2013.01);
(Continued)

(58) Field of Classification Search
None
See application file for complete search history.

(56) References Cited

U.S. PATENT DOCUMENTS 7,576,031 B2 * 8/2009 Beutel .................. B01J 23/44
502/326
2005/0031514 A1 2/2005 Patchett et al.
(Continued)

FOREIGN PATENT DOCUMENTS

| CN | 1832794 A | 9/2006 |
|---|---|---|
| JP | 2001-190960 | 7/2001 |
| JP | 2007-501353 | 1/2007 |

OTHER PUBLICATIONS

Majewski, W. A. Commercial DOC Technologies. DieselNet Technology Guide. 2011, pp. 1-4. https://www.dieselnet.com/tech/cat_pm.php.*

*Primary Examiner* — Walter D Griffin
*Assistant Examiner* — Jelitza Perez
(74) *Attorney, Agent, or Firm* — Finnegan, Henderson, Farabow, Garrett & Dunner, LLP

(57) ABSTRACT

An object of the present invention is to appropriately remove, from an exhaust gas, HC, CO, and ammonia flowing out from a filter (SCRF) on which an SCR catalyst is carried. In the present invention, a post-catalyst 8 is provided for an exhaust gas passage of an internal combus-
(Continued)

tion engine on a downstream side from SCRF along with a flow of the exhaust gas. The post-catalyst 8 is constructed to include an adsorption reduction part 81c which adsorbs ammonia and which reduces NOx by using ammonia as a reducing agent, a first oxidation part 81b which oxidizes ammonia, and a second oxidation part 82 which oxidizes HO and CO.

6 Claims, 2 Drawing Sheets

(51) Int. Cl.
*F01N 3/10* (2006.01)
*F01N 3/20* (2006.01)
*F01N 3/021* (2006.01)
*F01N 13/00* (2010.01)
*B01D 53/04* (2006.01)
*F01N 3/035* (2006.01)

(52) U.S. Cl.
CPC ......... *B01D 53/9468* (2013.01); *F01N 3/021* (2013.01); *F01N 3/035* (2013.01); *F01N 3/0814* (2013.01); *F01N 3/0828* (2013.01); *F01N 3/103* (2013.01); *F01N 3/106* (2013.01); *F01N 3/108* (2013.01); *F01N 3/2066* (2013.01); *F01N 13/009* (2014.06); *F01N 13/0097* (2014.06); *B01D 53/944* (2013.01); *B01D 53/9418* (2013.01); *B01D 2251/2062* (2013.01); *B01D 2255/1021* (2013.01); *B01D 2255/20738* (2013.01); *B01D 2255/20761* (2013.01); *B01D 2255/50* (2013.01); *B01D 2255/904* (2013.01); *B01D 2255/911* (2013.01); *B01D 2257/406* (2013.01); *B01D 2257/502* (2013.01); *B01D 2257/702* (2013.01); *B01D 2258/012* (2013.01); *F01N 2510/063* (2013.01); *F01N 2510/0684* (2013.01); *F01N 2560/06* (2013.01); *F01N 2560/14* (2013.01); *F01N 2570/18* (2013.01); *F01N 2610/02* (2013.01); *Y02T 10/24* (2013.01)

(56) References Cited

U.S. PATENT DOCUMENTS

| | | |
|---|---|---|
| 2005/0054524 A1* | 3/2005 | Tran .................. B01D 53/8634 502/312 |
| 2007/0137184 A1 | 6/2007 | Patchett et al. |
| 2008/0132405 A1 | 6/2008 | Patchett et al. |
| 2009/0193794 A1* | 8/2009 | Robel ................ F02M 25/0718 60/295 |
| 2009/0255241 A1 | 10/2009 | Patchett et al. |
| 2010/0077739 A1* | 4/2010 | Rodman ................ F01N 3/035 60/301 |
| 2010/0175372 A1* | 7/2010 | Lambert ............ B01D 53/9472 60/297 |
| 2011/0058999 A1* | 3/2011 | Ettireddy ........... B01D 53/9418 423/213.5 |
| 2012/0034133 A1 | 2/2012 | Patchett et al. |
| 2014/0349841 A1 | 11/2014 | Patchett et al. |
| 2015/0011377 A1 | 1/2015 | Patchett et al. |
| 2015/0126358 A1 | 5/2015 | Patchett et al. |
| 2015/0151250 A1 | 6/2015 | Patchett et al. |
| 2015/0159533 A1 | 6/2015 | Patchett et al. |
| 2015/0165426 A1 | 6/2015 | Patchett et al. |
| 2015/0190798 A1 | 7/2015 | Patchett et al. |
| 2016/0175823 A1 | 6/2016 | Patchett et al. |

\* cited by examiner

EXHAUST GAS PURIFICATION APPARATUS FOR INTERNAL COMBUSTION ENGINE

CROSS-REFERENCE TO RELATED APPLICATIONS

This application is a national phase application of International Application No. PCT/JP2012/079794, filed Nov. 16, 2012, the content of which is incorporated herein by reference.

TECHNICAL FIELD

The present invention relates to an exhaust gas purification apparatus for an internal combustion engine.

BACKGROUND ART

Conventionally, an exhaust gas purification apparatus provided for an exhaust gas passage of an internal combustion engine has been developed, in which a selective catalytic reduction NOx catalyst (hereinafter referred to as "SCR catalyst") is carried on a filter. The filter traps the particulate matter (hereinafter referred to as "PM") contained in the exhaust gas. The SCR catalyst reduces NOx contained in the exhaust gas by using ammonia ($NH_3$) as a reducing agent. The filter, which carries the SCR catalyst as described above, is hereinafter referred to as "SCRF" in some cases.

When SCRF is adopted as the exhaust gas purification apparatus, it is possible to further decrease the size of the exhaust gas purification apparatus as compared with a case in which the filter and the SCR catalyst are separately provided for the exhaust gas passage. Therefore, it is possible to improve the installation performance of the exhaust gas purification apparatus. Further, when SCRF is adopted, the SCR catalyst can be arranged on the more upstream side in the exhaust gas passage. The more upstream the SCR catalyst is arranged in the exhaust gas passage, the more easily the SCR catalyst is heated by the heat of the exhaust gas. Therefore, it is possible to improve the warming-up performance of the SCR catalyst, and it is possible to improve the NOx purification rate of the SCR catalyst.

Patent Document 1 discloses a system comprising an oxidation catalyst, an injector, SCRF, and a slip oxidation catalyst which are provided in this order from the upstream side along with the flow of the exhaust gas in an exhaust gas passage of a diesel engine. The injector is a device which injects ammonia or an ammonia precursor into the exhaust gas. The slip oxidation catalyst is a catalyst which oxidizes ammonia allowed to pass through SCRF.

Patent Document 2 discloses an exhaust gas purification catalyst comprising an oxidation catalyst, a three-way catalyst, and an HC adsorbing material. Further, Patent Document 2 discloses the following fact. That is, the exhaust gas purification catalyst contains the HC adsorbing material to provide such a concentration distribution that the amount thereof is large on the upstream side and the amount thereof is small on the downstream side along with the flow of the exhaust gas. Further, the exhaust gas purification catalyst contains the oxidation catalyst or the three-way catalyst to provide such a concentration distribution that the amount thereof is small on the upstream side and the amount thereof is large on the downstream side along with the flow of the exhaust gas.

PRIOR ART DOCUMENTS

Patent Documents

Patent Document 1: Japanese Unexamined Patent Application Publication 2007-501353
Patent Document 2: Japanese Patent Application Laid-Open No. 2001-190960

SUMMARY OF THE INVENTION

Problems to be Solved by the Invention

Ammonia or an ammonia precursor is supplied to SCRF. Then, NOx contained in the exhaust gas is reduced by using ammonia as a reducing agent by means of the SCR catalyst carried on SCRF. In this case, when ammonia is oxidized, NOx is produced in some cases. It is necessary that the production of NOx, which is caused as described above, should be suppressed. Therefore, it is difficult to allow SCRF to carry a catalyst having a high oxidizing ability.

For this reason, if hydrocarbon (HC) and/or carbon monoxide (CO) is/are contained in the exhaust gas flowing into SCRF, it is feared that HC and/or CO may pass through SCRF without being oxidized by SCRF. Further, if PM accumulated on SCRF is oxidized, CO is produced. CO produced as described above is hardly oxidized by SCRF as well. Therefore, it is feared that CO may flow out from SCRF.

Further, it is feared that ammonia, which is not consumed for the reduction of NOx by the SCR catalyst carried on SCRF, may also flow out from SCRF.

The present invention has been made taking the foregoing problem into consideration, an object of which is to provide a technique which makes it possible to appropriately remove, from the exhaust gas, HC, CO, and ammonia flowing out from SCRF.

Means for Solving the Problems

In the present invention, a post-catalyst is provided for an exhaust gas passage disposed on a downstream side from SCRF, the post-catalyst being constructed to include an adsorption reduction part which adsorbs ammonia and which reduces NOx by using ammonia as a reducing agent, a first oxidation part which oxidizes ammonia, and a second oxidation part which oxidizes HC and CO.

In particular, according to the present invention, there is provided an exhaust gas purification apparatus for an internal combustion engine, comprising:

a filter (SCRF) which is provided for an exhaust gas passage of the internal combustion engine and which traps particulate matter contained in an exhaust gas, the filter including a selective catalytic reduction NOx catalyst carried thereon for reducing NOx contained in the exhaust gas by using ammonia as a reducing agent;

an ammonia supply device configured to supply ammonia or an ammonia precursor to the filter; and a post-catalyst which is provided for the exhaust gas passage on a downstream side from the filter, wherein the post-catalyst is constructed to include:

an adsorption reduction part which has a function to adsorb ammonia and a function to reduce NOx by using ammonia as the reducing agent;

a first oxidation part which is positioned on a downstream side from the adsorption reduction part along with a flow of the exhaust gas and which has a function to oxidize ammonia; and a second oxidation part which is positioned on a downstream side from the adsorption reduction part and the first oxidation part along with the flow of the exhaust gas, which has an oxidation ability higher than that of the first oxidation part, and which has a function to oxidize HC and CO.

In the exhaust gas purification apparatus according to the present invention, HC, CO, and ammonia, which flow out from SCRF, flow into the post-catalyst. When ammonia flows into the post-catalyst, a part of ammonia adsorbs to the adsorption reduction part. Further, another part of ammonia, which flows into the post-catalyst, is oxidized by the first oxidation part. Accordingly, $N_2$ or NOx is produced. Then, when NOx is produced in accordance with the oxidation of ammonia, NOx is reduced by using, as the reducing agent, ammonia adsorbed in the adsorption reduction part.

Further, when HC and CO flow into the post-catalyst, HC and CO are oxidized by the second oxidation part having the oxidation ability higher than that of the first oxidation part. Further, in the post-catalyst, the second oxidation part is positioned on the downstream side along with the flow of the exhaust gas as compared with the adsorption reduction part and the first oxidation part. Furthermore, in the post-catalyst, the first oxidation part is positioned on the downstream side along with the flow of the exhaust gas as compared with the adsorption reduction part. Therefore, such a situation is suppressed that ammonia, which flows into the post-catalyst, is converted into NOx by being oxidized by the first oxidation part or the second oxidation part without being adsorbed in the adsorption reduction part. Further, the oxidation ability of the first oxidation part is lower than the oxidation ability of the second oxidation part. Therefore, excessive oxidation of ammonia, which would be otherwise caused by the first oxidation part, is suppressed.

Therefore, according to the present invention, HC, CO, and ammonia, which flow out from SCRF, can be appropriately removed from the exhaust gas.

In the present invention, the adsorption reduction part of the post-catalyst may be formed such that a metal, which has an oxidation ability lower than that of a noble metal, is carried on a carrier composed of zeolite as a material. Ammonia can be adsorbed by using zeolite as the carrier. Then, the metal, which has the oxidation ability lower than that of the noble metal, is carried on the carrier, and thus the reduction of NOx can be facilitated by using adsorbed ammonia as the reducing agent.

Further, in the present invention, each of the first oxidation part and the second oxidation part of the post-catalyst may be formed by carrying a noble metal on a carrier. In this case, a carrying amount of the noble metal per unit area of the second oxidation part is larger than a carrying amount of the noble metal per unit area of the first oxidation part. Accordingly, the oxidation ability of the second oxidation part can be made higher than the oxidation ability of the first oxidation part.

Advantageous Effect of the Invention

According to the present invention, HC, CO, and ammonia, which flow out from SCRF, can be appropriately removed from the exhaust gas.

EMBODIMENTS FOR CARRYING OUT THE INVENTION

An explanation will be made below on the basis of the drawings about a specified embodiment of the present invention. For example, the dimension or size, the material, the shape, and the relative arrangement of each of constitutive parts or components described in the embodiment of the present invention are not intended to limit the technical scope of the invention only thereto unless specifically noted.
(Schematic Arrangement of Intake/Exhaust System)

Figure 1:
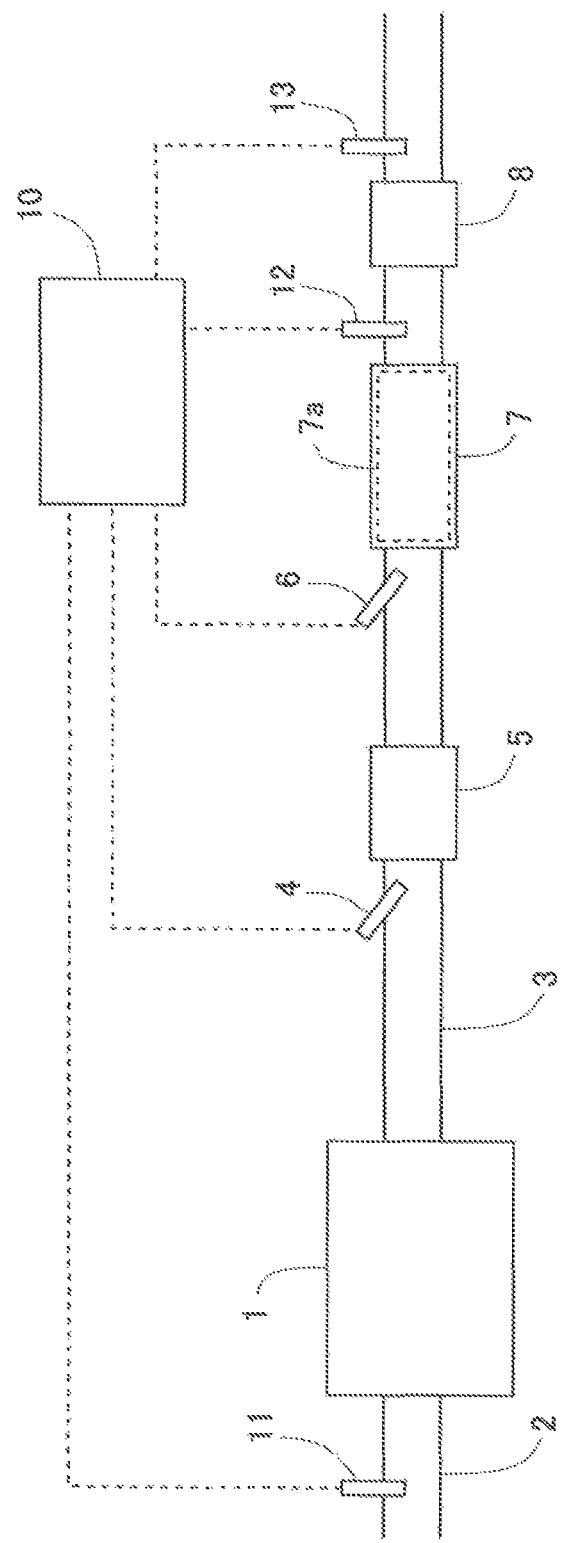
FIG. 1 shows a schematic arrangement of an intake/exhaust system of an internal combustion engine according to an embodiment.

FIG. 1 shows a schematic arrangement of an intake/exhaust system of the internal combustion engine according to this embodiment. The internal combustion engine 1 is a diesel engine for driving a vehicle. An intake gas passage 2 and an exhaust gas passage 3 are connected to the internal combustion engine 1. An air flow meter 11, which detects the intake air amount of the internal combustion engine 1, is provided for the intake gas passage 2.

A fuel addition valve 4, a pre-catalyst (front stage catalyst) 5, an ammonia addition valve 6, SCRF 7, a first exhaust gas temperature sensor 12, a post-catalyst (back stage catalyst) 8, and a second exhaust gas temperature sensor 13 are provided for the exhaust gas passage 3 in an order as referred from the upstream side along with the flow of the exhaust gas.

The pre-catalyst 5 is an oxidation catalyst. However, the pre-catalyst 5 may be any catalyst other than the oxidation catalyst provided that the catalyst has the oxidizing function. The fuel addition valve 4 adds the fuel into the exhaust gas in order to supply the fuel to the pre-catalyst 5. Note that the fuel can be also supplied to the pre-catalyst 5 without providing the fuel addition valve 4 such that the subsidiary fuel injection is executed at a timing at which the injected fuel is not subjected to the combustion and the injected fuel is discharged in an unburned state to the exhaust gas passage 3 in the internal combustion engine 1.

SCRF 7 is constructed such that an SCR catalyst 7a is carried on a wall flow type filter for trapping PM contained in the exhaust gas. The SCR catalyst 7a reduces NOx contained in the exhaust gas by using ammonia as the reducing agent. The ammonia addition valve 6 adds ammonia gas into the exhaust gas in order to supply ammonia to SCRF 7. When ammonia is supplied to SCRF 7, the ammonia is once adsorbed in the SCR catalyst 7a carried on SCRF 7. Further, the adsorbed ammonia behaves as the reducing agent, and NOx contained in the exhaust gas is reduced. Note that if the oxidation ability of the catalyst carried on SCRF 7 is high, NOx is easily produced in accordance with the oxidation of ammonia by SCRF 7. In order to suppress the production of NOx as described above, the oxidation ability of the SCR catalyst 7 is extremely lowered.

In this embodiment, the ammonia addition valve 6 corresponds to the ammonia supply device according to the present invention. However, the ammonia supply device according to the present invention may be a device which supplies ammonia as liquid or solid. Further, the ammonia supply device according to the present invention may be a device which supplies an ammonia precursor. For example, in this embodiment, it is also allowable to provide a urea addition valve for adding an aqueous urea solution into the exhaust gas, in place of the ammonia addition valve 6. In this case, urea is supplied as the ammonia precursor to SCRF 7. Then, urea is hydrolyzed, and thus ammonia is produced.

The post-catalyst 8 is a catalyst which is provided to remove HC, CO, and ammonia contained in the exhaust gas. The arrangement of the post-catalyst 8 will be described later on.

The first exhaust gas temperature sensor 12 and the second exhaust gas temperature sensor 13 are sensors which detect the temperature of the exhaust gas. An electronic control unit (ECU) 10 is provided in combination with the internal combustion engine 1. Various sensors, which include, for example, the air flow meter 11, the first exhaust gas temperature sensor 12, and the second exhaust gas temperature sensor 13, are electrically connected to ECU 10. Then, output signals of various sensors are inputted into ECU 10. ECU 10 estimates the flow rate of the exhaust gas in the exhaust gas passage 3 on the basis of the output value of the air flow meter 11. Further, ECU 10 estimates the temperature of the SCRF 7 on the basis of the output value of the first exhaust gas temperature sensor 12, and ECU 10 estimates the temperature of the post-catalyst 8 on the basis of the output value of the second exhaust gas temperature sensor 13.

Further, the fuel addition valve 4 and the ammonia addition valve 6 are electrically connected to ECU 10. Then, the devices as described above are controlled by ECU 10.

For example, ECU 10 executes the filter regeneration process by controlling the fuel addition valve 4. The filter regeneration process is the process in order to remove PM accumulated on SCRF 7. When the fuel is added from the fuel addition valve 4, and the fuel is supplied to the pre-catalyst 5, then the fuel is oxidized, and thus the heat of combustion (heat of oxidation) is generated. The exhaust gas, which flows into SCRF 7, is heated by the heat of combustion. Accordingly, the temperature of SCRF 7 is raised. Then, the fuel addition amount added from the fuel addition valve 4 is controlled, and thus the temperature of SCRF 7 is raised to a predetermined PM oxidation temperature (for example, 600 to 650° C.) at which the oxidation of PM can be performed. As a result, PM accumulated on SCRF 7 is oxidized and removed.

Even when the filter regeneration process as described above is not executed, if the temperature of the exhaust gas flowing into SCRF 7 is raised resulting from, for example, such a situation that the operation state of the internal combustion engine 1 resides in the high load operation, then the temperature of SCRF 7 is raised to the PM oxidation temperature in some cases. Even in such a situation, PM accumulated on SCRF 7 is oxidized.

(Schematic Arrangement of Post-Catalyst)

Figure 2A:
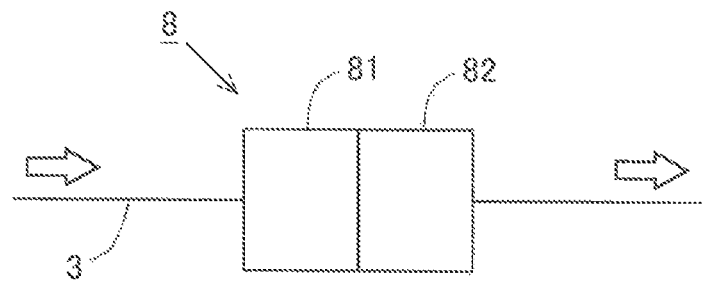
FIG. 2A shows a schematic arrangement of a post-catalyst according to the embodiment.
Figure 2B:
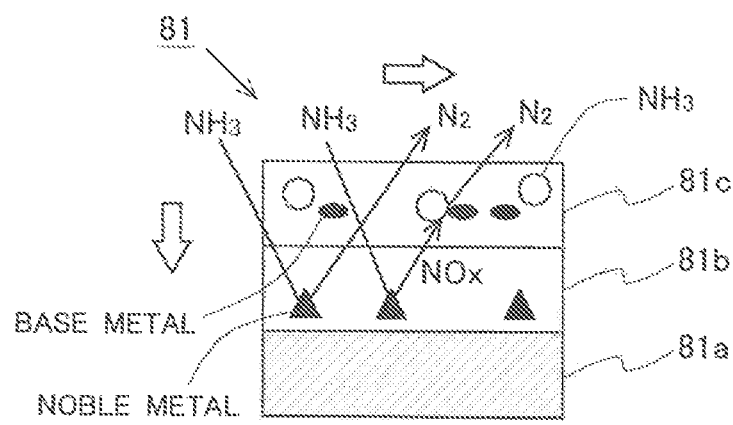
FIG. 2B shows a schematic arrangement of an ammonia removing catalyst included in the post-catalyst according to the embodiment.

An explanation will now be made on the basis of FIGS. 2A and 2B about the schematic arrangement of the post-catalyst 8 according to this embodiment. FIG. 2A shows a schematic arrangement of the post-catalyst 8 according to this embodiment. FIG. 2B shows a schematic arrangement of an ammonia removing catalyst 81 included in the post-catalyst 8 according to this embodiment. Note that in FIGS. 2A and 2B, blanked arrows indicate the flow directions of the exhaust gas.

The post-catalyst 8 according to this embodiment comprises an ammonia removing catalyst 81 and an HC/CO removing catalyst 82. In the post-catalyst 8, the HC/CO removing catalyst 82 is positioned on the downstream side from the ammonia removing catalyst 81 along with the flow of the exhaust gas in the exhaust gas passage 3.

The ammonia removing catalyst 81 is constructed such that an ammonia oxidation layer 81*b* is provided on a base member 81*a*, and an adsorption reduction layer 81*c* is provided on the ammonia oxidation layer 81*b*. The ammonia oxidation layer 81*b* has a function to oxidize ammonia. For example, the ammonia oxidation layer 81*b* is formed such that a noble metal (precious metal) (for example, Pt, Pd, or Rh) is carried on a carrier composed of a material of, for example, aluminum oxide ($Al_2O_3$) or zeolite.

The adsorption reduction layer 81*c* has a function to adsorb ammonia and a function to reduce NOx by using ammonia as the reducing agent. For example, the adsorption reduction layer 81*c* is formed such that a base metal (non-precious metal) (for example, Fe or Cu), which has the oxidation ability lower than that of the noble metal, is carried on a carrier composed of a material of zeolite. When zeolite is used as the carrier, it is thereby possible to adsorb ammonia. Further, when the base metal, which has the oxidation ability lower than that of the noble metal, is carried on the carrier, it is thereby possible to facilitate the reduction of NOx by using adsorbed ammonia as the reducing agent.

Note that in the ammonia removing catalyst 81, the exhaust gas passes through the adsorption reduction layer 81*c*, and the exhaust gas arrives at the ammonia oxidation layer 81*b*. Therefore, the ammonia oxidation layer 81*b* is positioned on the downstream side along with the flow of the exhaust gas as compared with the adsorption reduction layer 81*c*.

The HC/CO removing catalyst 82 is an oxidation catalyst which has a function to oxidize HC and CO. The HC/CO removing catalyst 82 has the oxidation ability which is higher than that of the ammonia oxidation layer 81*b* of the ammonia removing catalyst 81. For example, the HC/CO removing catalyst 82 is formed such that a noble metal is carried on a carrier composed of material of, for example, aluminum oxide or zeolite, in the same manner as the ammonia oxidation layer 81*b* of the ammonia removing catalyst 81. In this case, the carrying amount of the noble metal per unit area of the HC/CO removing catalyst 82 is larger than the carrying amount of the noble metal per unit area of the ammonia oxidation layer 81*b*. Accordingly, the oxidation ability of the HC/CO removing catalyst 82 can be made higher than the oxidation ability of the ammonia oxidation layer 81*b*.

Note that the HC/CO removing catalyst 82 may be constructed to include an HC adsorption layer which has a function to adsorb HC and an oxidation layer which has an oxidizing function. In this case, the oxidation layer is arranged on the downstream side along with the flow of the exhaust gas as compared with the HC adsorption layer. According to the construction as described above, HC is once adsorbed in the HC adsorption layer before HC arrives at the oxidation layer. Thus, the poisoning of the oxidation layer caused by HC is suppressed. Therefore, it is possible to facilitate the oxidation of CO in the oxidation layer.

In the arrangement described above, the adsorption reduction layer 81*c* corresponds to the adsorption reduction part according to the present invention, the ammonia oxidation layer 81*b* corresponds to the first oxidation part according to the present invention, and the HC/CO removing catalyst 82 corresponds to the second oxidation part according to the present invention.

(Effect of Arrangement According to this Embodiment)

In this embodiment, when the filter regeneration process is executed, parts of HC and CO, which are contained in the fuel supplied to the pre-catalyst 5, sometimes pass through the pre-catalyst 5 without being oxidized by the pre-catalyst 5. HC and CO, which have passed through the pre-catalyst 5, flow into SCRF 7. However, the SCR catalyst 7*a*, which is carried on SCRF 7, has the extremely low oxidizing ability. For this reason, HC and CO flowing into SCRF 7 are hardly oxidized by the SCR catalyst 7*a*. Therefore, HC and CO, which have passed through the pre-catalyst 5, also pass through SCRF 7 in some cases.

Further, when PM accumulated on SCRF 7 is oxidized, CO is produced. CO is hardly oxidized by SCRF 7 as well. Therefore, when CO is produced by the oxidation of PM, it is feared that CO may also flow out from SCRF 7. Further, ammonia, which is added from the ammonia addition valve 6, is supplied as the reducing agent to SCRF 7. However, a part of supplied ammonia is not consumed for the reduction of NOx caused by the SCR catalyst 7*a* in some cases. In such a situation, ammonia, which is not consumed for the reduction of NOx caused by the SCR catalyst 7*a*, flows out from SCRF 7.

Then, in this embodiment, when HC, CO, or ammonia flows out from SCRF 7, HC, CO, or ammonia flows into the post-catalyst 8. If ammonia flows into the post-catalyst 8, a part of ammonia adheres to the adsorption reduction layer 81*c* of the ammonia removing catalyst 81. Further, another part of ammonia which flows into the post-catalyst 8, i.e., ammonia which arrives at the ammonia oxidation layer 81*b* after passing through the adsorption reduction layer 81*c* is oxidized by the ammonia oxidation layer 81*b*. Accordingly, $N_2$ or NOx is produced. In the arrangement according to this embodiment, even when NOx is produced in accordance with the oxidation of ammonia in the ammonia oxidation layer 81*b*, NOx can be reduced by using, as the reducing agent, ammonia which adsorbs to the adsorption reduction layer 81*c*. In this way, according to this embodiment, ammonia can be removed from the exhaust gas by means of the ammonia removing catalyst 81 of the post-catalyst 8.

Further, when HC or CO flows into the post-catalyst 8, HC or CO is oxidized by the HC/CO removing catalyst 82 which has the oxidation ability higher than that of the ammonia oxidation layer 81*b* of the ammonia removing catalyst 81. Therefore, according to this embodiment, HC and CO can be removed from the exhaust gas by means of the HC/CO removing catalyst 82 of the post-catalyst 8.

Further, in the post-catalyst 8 according to this embodiment, the HC/CO removing catalyst 82 is positioned on the downstream side along with the flow of the exhaust gas as compared with the ammonia removing catalyst 81. Further, in the ammonia removing catalyst 81, the ammonia oxidation layer 81*b* is positioned on the downstream side along with the flow of the exhaust gas as compared with the adsorption reduction layer 81*c*. Therefore, it is possible to suppress such a situation that ammonia, which flows into the post-catalyst 8, is converted into NOx by being oxidized by the ammonia oxidation layer 81*b* or the ammonia removing catalyst 81 without being adsorbed in the adsorption reduction layer 81*c*. Further, the oxidation ability of the ammonia oxidation layer 81*b* is lower than the oxidation ability of the ammonia removing catalyst 81. Therefore, it is possible to suppress such a situation that ammonia is excessively oxidized by the ammonia oxidation layer 81*b*.

(Modified Embodiment)

Figure 3:
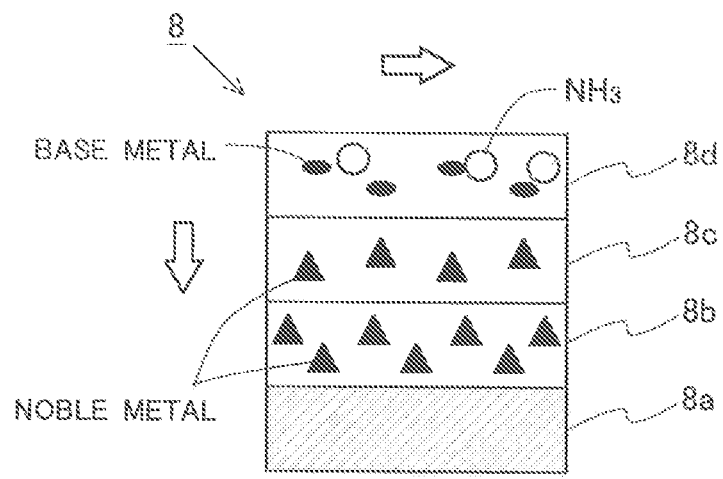
FIG. 3 shows a schematic arrangement of a modified embodiment of the post-catalyst according to the embodiment.

FIG. 3 shows a schematic arrangement of a modified embodiment of the post-catalyst 8 according to the embodiment of the present invention. In this arrangement, an HC/CO oxidation layer 8*b* is provided on a base member 8*a*, an ammonia oxidation layer 8*c* is provided on the HC/CO oxidation layer 8*b*, and an adsorption reduction layer 8*d* is provided on the ammonia oxidation layer 8*c*.

The HC/CO oxidation layer 8*b* has the function which is the same as or equivalent to that of the HC/CO removing catalyst 82 in the arrangement shown in FIG. 2A. The ammonia oxidation layer 8*c* has the function which is the same as or equivalent to that of the ammonia oxidation layer 81*b* in the arrangement shown in FIG. 2B. The adsorption reduction layer 8*d* has the function which is the same as or equivalent to that of the adsorption reduction layer 81*c* in the arrangement shown in FIG. 2B.

When each of the ammonia oxidation layer 8*c* and the HC/CO oxidation layer 8*b* is formed by carrying a noble metal on a carrier, the carrying amount of the noble metal per unit area of the HC/CO oxidation layer 8*b* is made larger than the carrying amount of the noble metal per unit are of the ammonia oxidation layer 8*c*. Accordingly, the oxidation ability of the HC/CO oxidation layer 8*b* can be raised as compared with the oxidation ability of the ammonia oxidation layer 8*c*.

In this arrangement, the exhaust gas passes through the adsorption reduction layer 8*d*, and the exhaust gas arrives at the ammonia oxidation layer 8*c*. Further, the exhaust gas passes through the ammonia oxidation layer 8*c*, and the exhaust gas arrives at the HC/CO oxidation layer 8*b*. Therefore, the HC/CO oxidation layer 8*b* is positioned on the downstream side along with the flow of the exhaust gas as compared with the adsorption reduction layer 8*d* and the ammonia oxidation layer 8*c*. Further, the ammonia oxidation layer 8*c* is positioned on the downstream side along with the flow of the exhaust gas as compared with the adsorption reduction layer 8*d*. Note that in this arrangement, it is necessary to allow the exhaust gas to pass through the ammonia oxidation layer 8*c*, and hence it is preferable that zeolite, which is a porous material, is used as the carrier for the ammonia oxidation layer 8*c*.

In this arrangement, the adsorption reduction layer 8*d* corresponds to the adsorption reduction part according to the present invention, the ammonia oxidation layer 8*c* corresponds to the first oxidation part according to the present invention, and the HC/CO oxidation layer 8*b* corresponds to the second oxidation part according to the present invention.

Even when the post-catalyst 8 is constructed as in this arrangement, it is possible to obtain the effect which is the same as or equivalent to that obtained when the post-catalyst 8 is constructed as shown in FIGS. 2A and 2B.

(Other Arrangements)

In the embodiment of the present invention, if the distributions of HC, CO, and ammonia, which are provided in the direction perpendicular to the axial direction of the exhaust gas passage 3 in the exhaust gas flowing into the post-catalyst 8, are biased, HC, CO, and ammonia are hardly removed by the post-catalyst 8. Accordingly, it is also allowable that a throttle portion, which has a small cross-sectional area in the direction perpendicular to the axial direction, is provided for the exhaust gas passage 3 on the downstream side from SCRF 7 and on the upstream side from the post-catalyst 8. When the throttle portion as described above is provided, it is thereby possible to decrease the deviation or bias of the distributions of HC, CO, and ammonia provided in the direction perpendicular to the axial direction of the exhaust gas passage 3 in the exhaust gas flowing into the post-catalyst 8. As a result, HC, CO, and ammonia are easily removed by the post-catalyst 8.

Note that in place of the throttle portion, it is also allowable to provide a dispersion plate for dispersing HC, CO, and ammonia in the exhaust gas. Also in this case, it is possible to obtain an effect which is the same as or equivalent to that obtained when the throttle portion is provided.

DESCRIPTION OF THE REFERENCE SIGNS

1: internal combustion engine
2: intake gas passage
3: exhaust gas passage
4: fuel addition valve
5: pre-catalyst
6: ammonia addition valve
7: filter (SCRF)
7a: selective catalytic reduction NOx catalyst (SCR catalyst)
8: post-catalyst
8a: base member
8b: HC/CO oxidation layer
8c: ammonia oxidation layer
8d: adsorption reduction layer
81: ammonia removing catalyst
81a: base member
81b: ammonia oxidation layer
81c: adsorption reduction layer
82: HC/CO removing catalyst
10: ECU

The invention claimed is:

1. An exhaust gas purification apparatus for an internal combustion engine, comprising:
   a filter which is provided for an exhaust gas passage of the internal combustion engine and which traps particulate matter contained in an exhaust gas, the filter including a selective catalytic reduction NOx catalyst carried thereon for reducing NOx contained in the exhaust gas by using ammonia as a reducing agent;
   an ammonia supply device configured to supply ammonia or an ammonia precursor to the filter; and
   a post-catalyst which is provided for the exhaust gas passage on a downstream side from the filter, wherein the post-catalyst is constructed to include:
   an adsorption reduction part which has a function to adsorb ammonia and a function to reduce NOx by using ammonia as the reducing agent;
   a first oxidation part which is positioned on a downstream side from the adsorption reduction part along with a flow of the exhaust gas and which has a function to oxidize ammonia; and
   a second oxidation part which is positioned on a downstream side from the adsorption reduction part and the first oxidation part along with the flow of the exhaust gas, which has an oxidation ability higher than that of the first oxidation part, and which has a function to oxidize HC and CO.

2. The exhaust gas purification apparatus for the internal combustion engine according to claim 1, wherein the adsorption reduction part is formed such that a metal, which has an oxidation ability lower than that of a noble metal, is carried on a carrier composed of zeolite as a material.

3. The exhaust gas purification apparatus for the internal combustion engine according to claim 1, wherein:
   each of the first oxidation part and the second oxidation part is formed by carrying a noble metal on a carrier; and
   a carrying amount of the noble metal per unit area of the second oxidation part is larger than a carrying amount of the noble metal per unit area of the first oxidation part.

4. The exhaust gas purification apparatus for the internal combustion engine according to claim 2, wherein:
   each of the first oxidation part and the second oxidation part is formed by carrying a noble metal on a carrier; and
   a carrying amount of the noble metal per unit area of the second oxidation part is larger than a carrying amount of the noble metal per unit area of the first oxidation part.

5. The exhaust gas purification apparatus for the internal combustion engine according to claim 1, wherein the first oxidation part is provided on a base member, and the adsorption reduction part is provided on the first oxidation part.

6. The exhaust gas purification apparatus for the internal combustion engine according to claim 1, wherein the second oxidation part is provided on a base member, the first oxidation part is provided on the second oxidation part, and the adsorption reduction part is provided on the first oxidation part.

* * * * *